United States Patent [19]
Takehara

[11] Patent Number: 5,592,074
[45] Date of Patent: Jan. 7, 1997

[54] BATTERY POWER SUPPLY SYSTEM

[75] Inventor: Nobuyoshi Takehara, Nagahama, Japan

[73] Assignee: Canon Kabushiki Kaisha, Tokyo, Japan

[21] Appl. No.: 74,463

[22] Filed: Jun. 10, 1993

[30] Foreign Application Priority Data

Jun. 26, 1992 [JP] Japan .................................. 4-169682

[51] Int. Cl.⁶ ...................................... H02J 3/46
[52] U.S. Cl. ........................................ 363/131; 323/906
[58] Field of Search .......................... 363/131; 323/906; 307/64; 320/56, 61; 340/661, 825.06

[56] References Cited

U.S. PATENT DOCUMENTS

| | | | |
|---|---|---|---|
| 4,341,607 | 7/1982 | Tison | 323/906 |
| 4,360,881 | 11/1982 | Martinson | 364/493 |
| 4,390,940 | 6/1983 | Corbeflin et al. | 363/132 |
| 4,404,472 | 9/1983 | Steigerwald | 323/906 |
| 4,763,014 | 8/1988 | Model et al. | 307/66 |
| 4,794,272 | 12/1988 | Bavaro et al. | 307/66 |
| 4,980,574 | 12/1990 | Cirrito | 323/906 |
| 5,025,486 | 6/1991 | Klughart | 455/54 |
| 5,268,832 | 12/1993 | Kandatsu | 323/906 |
| 5,359,280 | 10/1994 | Canter et al. | 323/282 |

FOREIGN PATENT DOCUMENTS

| | | |
|---|---|---|
| 0029744 | 6/1981 | European Pat. Off. . |
| 0408059 | 1/1991 | European Pat. Off. . |
| 0415228 | 3/1991 | European Pat. Off. . |
| 3725476 | 2/1989 | Germany . |
| 4021552 | 11/1990 | Germany . |
| 59-149669 | 8/1984 | Japan .............. H01M 8/04 |
| 59-198877 | 11/1984 | Japan . |
| 61-021516 | 1/1986 | Japan .............. G05F 1/67 |
| 62-145314 | 6/1987 | Japan . |
| 04153713 | 5/1992 | Japan . |
| 05091671 | 4/1993 | Japan . |

OTHER PUBLICATIONS

"Utility Intertied Photovoltaic System Islanding Experiments" by John Stevens; Ninteenth IEEE Photovoltaic Specialists Conference–1987, May 4–7, 1987, Louisiana, pp. 1134–1138.

"Development of a residential use, utility interactive PV inverter" by Y. Kandatsu, et al.; Technical Digest of the International PVSEC-5, Kyoto, Japan, 1990 pp. 905–908.

*Primary Examiner*—Matthew V. Nguyen
*Attorney, Agent, or Firm*—Fitzpatrick, Cella, Harper & Scinto

[57] ABSTRACT

A battery power supply system permits inexpensive introduction of a transfer break system to a solar cell generation system and quick release of reverse charge phenomenon. The battery power supply system comprises a solar cell array (1), a DC-AC inverter (2), a break device (3) for a commercial power system, and wireless communication device (4) as control device for controlling the conduction and break of the break device based on the information derived through wireless communication.

13 Claims, 11 Drawing Sheets

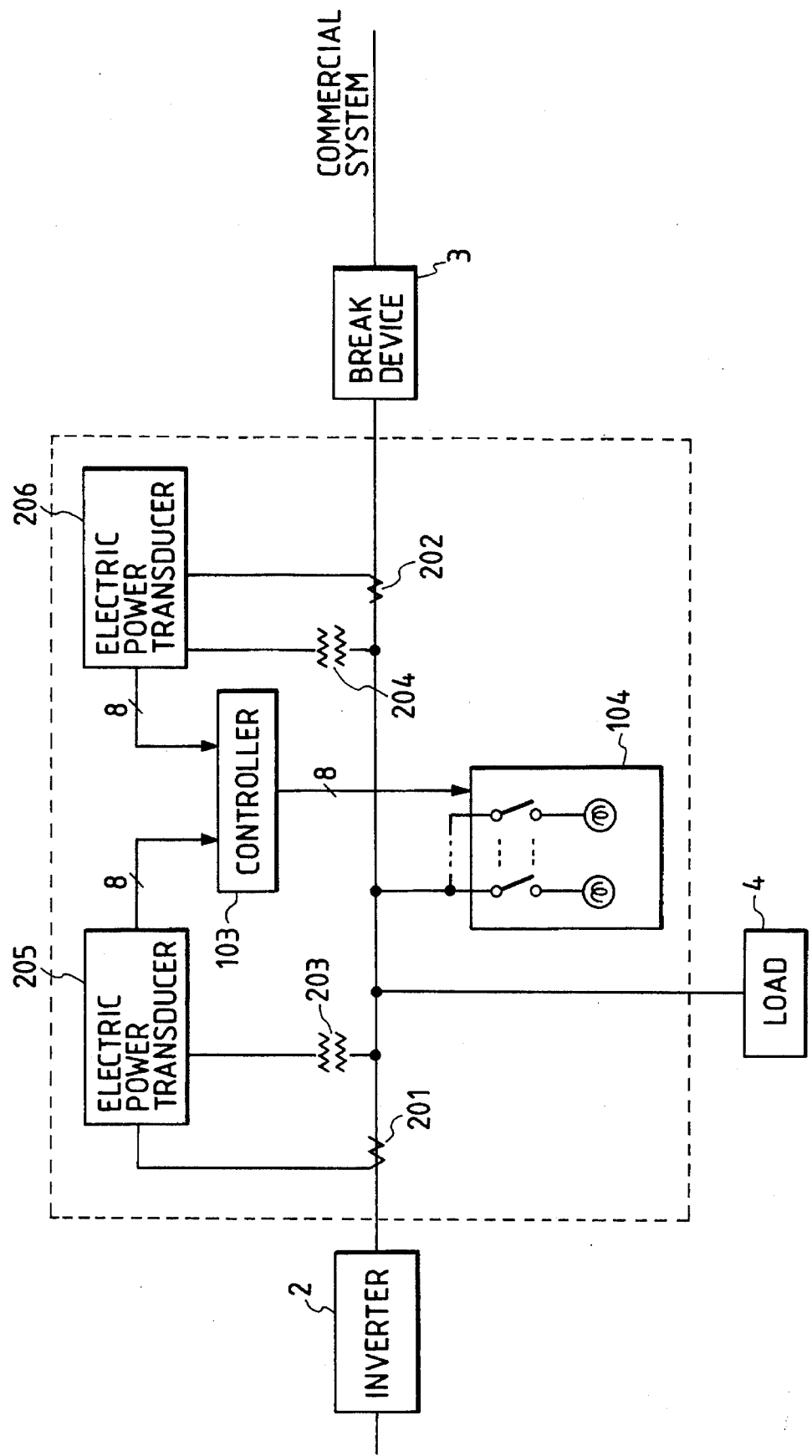

BATTERY POWER SUPPLY SYSTEM

BACKGROUND OF THE INVENTION

1. Field of the Invention

The present invention relates to a battery power supply system, and more particularly to an inexpensive battery power supply system which may quickly release a reverse charge phenomenon.

2. Related Background Art

Interest to a global environment has recently been very much enhanced and a great expectation has been paid to a solar cell which is a representative one of battery power supplies which are inexhaustible and clean energy sources. Today, the cost of a solar cell is less than 1000 Yen/W and it is ⅟₁₀ when compared with that of a few years ago. The electricity generated by the solar cell is more expensive than the existing commercial electric power as of 1994 but it is said that the cost of the solar sell will go down to 200 Yen/W in 2000, when the electricity can be generated by the solar cell with a comparable cost to that of the commercial power supply.

Since the solar cell is operative only during the sunshine, some backup means for the night and rainy day is required when it is to be used in a home. To this end, a system for using the power supply and the solar cell output in linkage through an inverter has been proposed and it has been put into practice.

One example of such linkage system is shown in FIG. 13. A DC power generated by a solar cell is converted to an AC power by a DC-AC inverter 2 and it is supplied to a load 5. In the absence of sum shine, the commercial power is supplied to the load 5 through a break device 3, which disconnects the solar generation system from the system line in response to a short circuit accident in the system or an accident of the commercial system. In most cases, it stops the DC-AC inverter 2.

However, in many cases, the power generated by the solar cell is in excess in daytime. The flow of the excess power to the power system is called a "reverse current". By the reverse current, the electricity generated by the solar cell can be used without waste. Such a reverse current type solar cell generation system would be an ideal manner of use of the solar cell. However, a problem of "reverse charge phenomenon" which is inherent to the reverse current system has not yet been solved.

The "reverse charge phenomenon" may occur when the quantity of generation by the solar cell generation system and the power consumption of a load connected thereto are substantially equal. In such a case, even if the electricity of the commercial power supply system is stopped or it stops by some cause, the solar cell generation system cannot detect the stop of the commercial power system and the solar cell generation system continues the independent operation. As a result, lines which are not to be active are charged and a risk occurs in a maintenance operation of the lines. Further, when the commercial power system is reclosed, the commercial power system and the solar cell generation system are not in synchronism and an excess current is generated and the reclosure may fail. When many solar cell generation systems are used in future, the "reverse charge phenomenon" may occur over a wide area.

In order to prevent the "reverse charge phenomenon", various method have been proposed as shown in Table 1 and tests of those methods have been conducted but no definite solution therefor has been found yet.

TABLE 1

| Method | Content | Remarks |
|---|---|---|
| 1. Countermeasure on solar cell generation system | | |
| (1) Methodic countermeasure | | |
| a. Adoption of current controlled inverter | •Use constant current source and no function to maintain voltage. | •Can localize conditions of occurence of reverse charge operation. |
| (2) Passive countermeasure | | |
| a. Phase monitor system | •Detect transitional variation of line volatge phase <br> •Detect abrupt change in phase difference between inverter output voltage and current. | •Not operable in a complete balanced condition. <br> Very effective for other cases. |
| b. Harmonics monitor system | •Monitor harmonic voltage generated by line load. <br><br> •Combine with current controlled inverter to primarily detect third harmonic component generated by pole transformer. | •Effect is influenced by line load status and is unstable. <br> •Not influenced by load status and is stable, but inverter output voltage should be sine wave. |
| (3) Active countermeasure | | |
| a. Frequency variation system | •Diverse inverter output frequency when system power supply losses. | •System for modulating phase of feedback waveform of system voltage and system for biasing frequency of oscillation circuit. Both are normally synchronized with frequency of line. |
| b. Output voltage or current variation system | •Continuously and finely vary inverter output voltage or current. | •Sine wave variation system and variation system by quasirandom pattern. Effect may be lowered when a number of solar cell generations systems are parallelly operated. |
| c. Output power variation system | | •System for initially imparting large |
| (1) Active power variation | •Continuously and finely vary inverter output active power. | AC amplitude variation and system for imparting small variation and forming positive |
| (2) Reactive power variation | •Continuously and finely vary inverter output reactive power. | feedback loop in reverse charge operation mode to amplify amplitude to detect resulting increase of voltage or frequency variation. In both systems, effect may be lowered when a number of solar cell generation systems are parallelly operated. |

TABLE 1-continued

| Method | Content | Remarks |
| --- | --- | --- |
| 2. Countermeasure on line | | |
| (1) Passive countermeasure | | |
| a. Line zero-voltage check device | •Check line zero-voltage after substation breaker has been opened. | Need to parallelly use transfer break. |
| (2) Active countermeasure | | |
| a. Reactive power injection system (Capacitor throw-in system) | •Check line zero-voltage after substation breaker has been opened. If voltage is present, balance of reactive power is destroyed by connecting capacitor. | •Very effective as post protection. |

Note)
There is shown an equilibrium range which can be detected by a conventional frequency and voltage monitor function at the time of equilibrium between power generation amount and load amount.

On the other hand, in a special high potential power transmission line, a "transfer break system" is used to avoid the reverse charge status. In the "transfer break", a break device is actuated by a break signal from a host substation to stop the system. However, in order to apply it to a low potential solar cell generation system, it is necessary to install a communication line to each of the solar cell generation systems, and it is not feasible because of a huge amount of cost.

A telephone line may be used as the communication line for the transfer break. In this case, a cost to install the communication line for each system may be significantly reduced. However, as described above, when a number of solar cell generation systems are widely used, the reverse charge phenomenon may possibly occur over a wide area. In such a case, all or most of the solar cell generation systems in the area of the reverse charge phenomenon must be broken.

In order to simultaneously break several tens to several thousands solar cell generation systems, a telephone line system which assigns the number to each of the users is not appropriate. To break one hundred systems, for example, telephone calls must be made at least one hundred times. Assuming that one user can be accessed in five seconds, it takes 500 seconds or more than eight minutes.

SUMMARY OF THE INVENTION

It is an object of the present invention to provide an inexpensive battery power supply system which can quickly release the reverse charge phenomenon.

It is another object of the present invention to provide a device for preventing the reverse current and the reverse charge without modifying an inverter by adding it to a solar cell generation system which may produce a reverse current.

The present invention provides a battery power supply system comprising a battery power supply, a DC-AC inverter for converting a DC output of the battery power supply to an AC output to supply it to a load, a break device electrically connected between an AC power system and the load, wireless communication means, and break device control means for controlling the conduction/break of the break device in accordance with information derived from the wireless communication means.

The frequency of the wireless communication means is around a middle wave broadcast band or a TV broadcast band.

The break device control means includes time information control means for controlling based on time information and identification information control means for controlling based on identification information.

The present invention also provides a battery power supply system comprising a DC-AC inverter for converting a DC output of a battery power supply to an AC output to supply it to a load, first power measurement means for measuring the output of the DC-AC inverter, second power measurement means for measuring an input power from a power system for powering to the load or a power consumption of the load, a dummy load device electrically connected between the power system and the load for controlling the amount of load, and control means for controlling the amount of load of the dummy load device based on the measurements of the first and second power measurement means.

The dummy load includes a secondary battery.

In accordance with the present invention, the break device is controlled by the reception result of the wireless communication means or the reverse charge of the inverter is prevented.

BRIEF DESCRIPTION OF THE DRAWINGS

FIG. 11 shows another embodiment of the battery power supply system having the reverse current and reverse charge prevention device of the present invention.

DETAILED DESCRIPTION OF THE PREFERRED EMBODIMENTS

The present invention is now described in detail with reference to the drawings.

Figure 1:
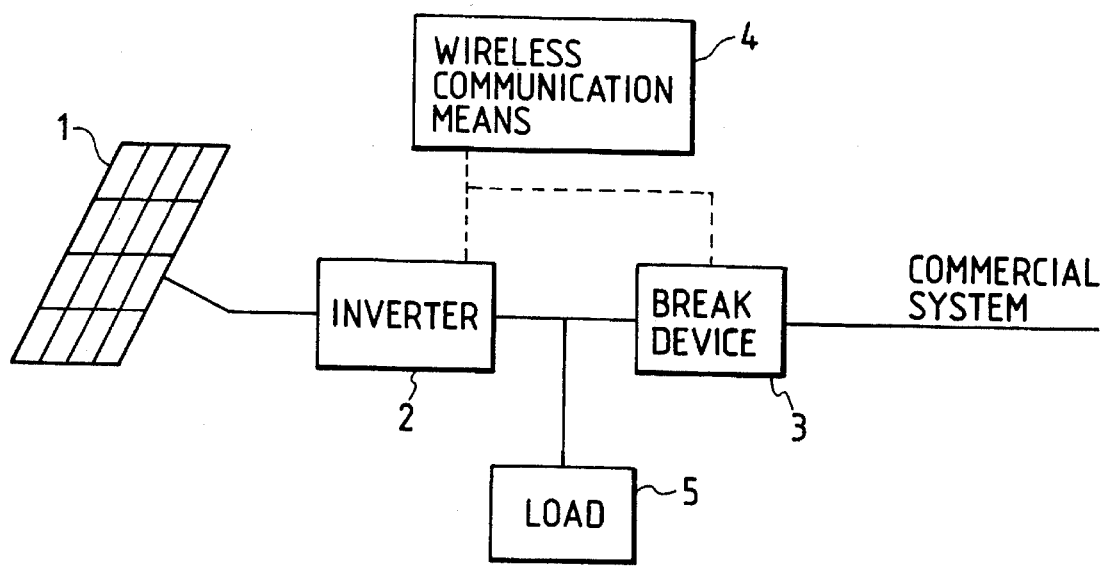
FIG. 1 shows a configuration of a battery power supply system of the present invention.

An embodiment of the battery power supply system of the present invention is shown in FIG. 1.

A solar cell array 1 having a plurality of solar cell modules converts sunshine to a DC power. As the solar cell module, a photo-electromotive device such as single crystal silicon, poly-crystalline silicon, amorphous silicon or a combination thereof may be used. A DC-AC inverter 2 converts the DC power from the solar cell array to an AC power and supplies it to a load 5. The DC-AC inverter 2 may be a self-excited type or a separately excited type, and among others, a PWM self-excited inverter which uses IGBT, power MOSFET and power transistor as switching devices is preferable. The inverter includes gate control means for the switching devices to start and stop the inverter. A break device 3 having control means therein mechanically separates a commercial power system and the solar cell generation system. Wireless communication means 4 is connected to the break device 3 and the control means in the DC-AC inverter 2. An embodiment of the wireless communication means 4 is shown in FIG. 2.

Figure 2:
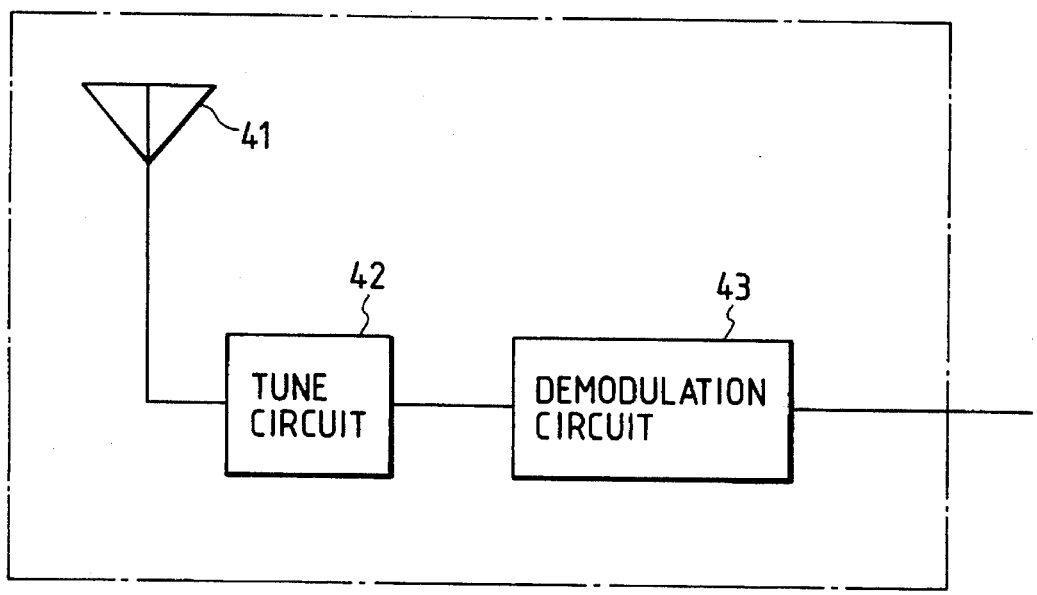
FIG. 2 shows a configuration of wireless communication means used in the battery power supply system of the present invention.

In FIG. 2, numeral 41 denotes an antenna which may be a bar antenna, a Yagi antenna, a parabola antenna or a rod antenna depending on a frequency and electric field intensity of an electromagnetic wave used. Numeral 42 denotes a tuning circuit for receiving a target frequency. Numeral 43 denotes a demodulation circuit which extracts a signal from the received electromagnetic wave. The frequency for the communication may be any frequency from long wave to UHF but a large antenna is principally needed for a frequency shorter than a relatively long short wave. In order to receive a frequency band of shorter than the short wave by a small antenna, it is necessary to transmit as strong electromagnetic wave as that of a broadcast station. When a frequency around a TV broadcast band is used, a TV antenna already installed in a home may be used and there is no need to additionally install the antenna. The signal used for the communication may be a coded signal which uses the on/off of the electromagnetic wave or a coded signal which uses frequency deviation. Alternatively, a signal in an audio frequency band may be used. The break signal preferably includes at least an ID signal for specifying a region and operation command information. The ID information (code number) may be assigned to a region having several hundreds or more users. By assigning one ID information to many users, more solar cell generation systems may be broken by one signal transmission. For example, one ID number code may be assigned throughout Japan and the break signal may be transmitted by using a BS system so that the solar cell generation systems throughout Japan can be simultaneously broken. In actual practice, the assignment region may be determined while taking the power transmission system into account. Time information or sender identification information may be further added to attain fine operation.

Figure 6:
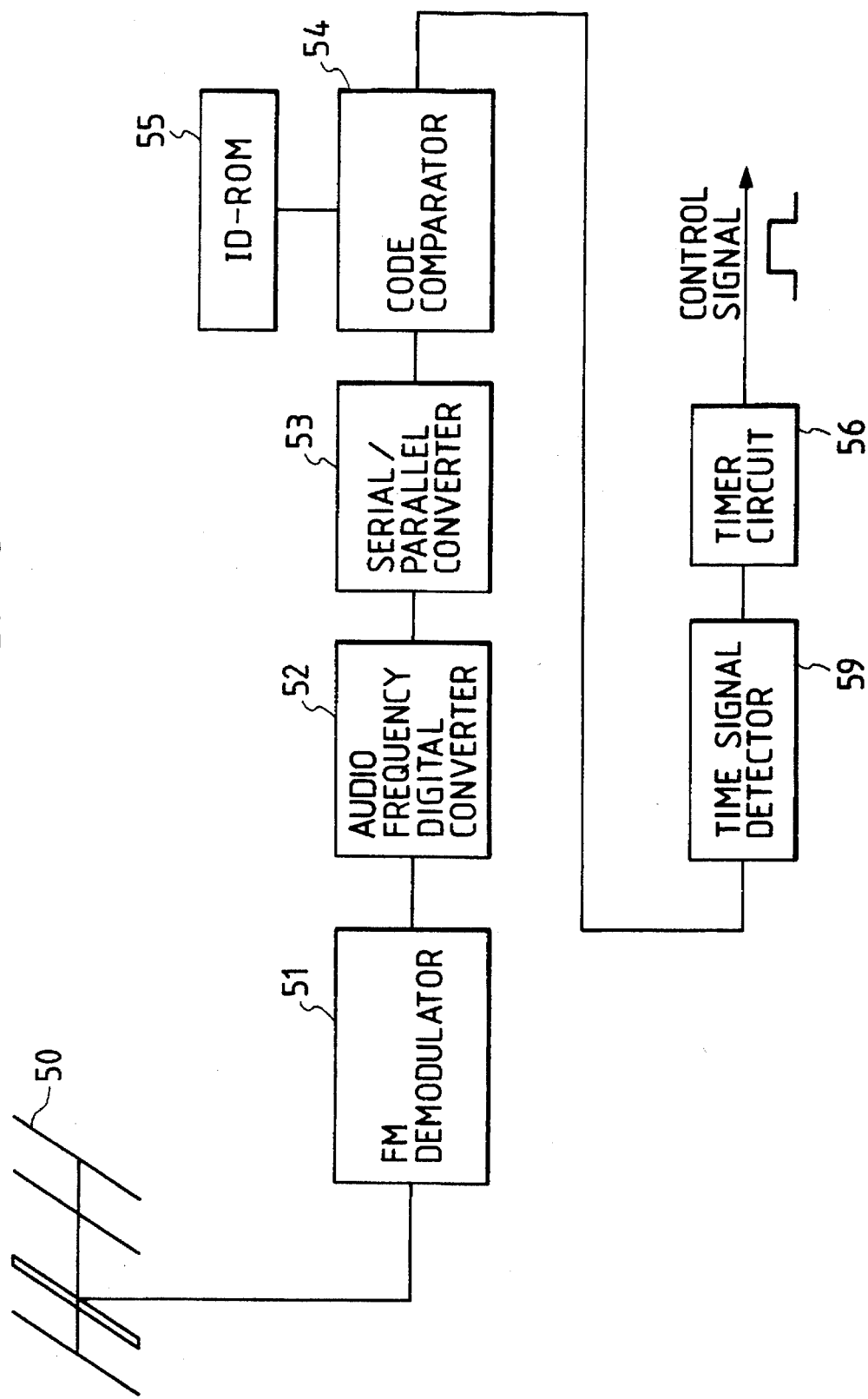
FIG. 6 shows a system for recovering a power after a predetermined time interval by using time information, used in the battery power supply system of the present invention.

For example, as shown in FIG. 6, when time information is to be utilized, "recovery time" information may be transmitted so that the solar cell generation system can be restarted at any desired time by a timer circuit 56 after the recovery of the power failure By transmitting "start time" and "stop time", it is possible to activate the system for only a desired time period by the sender.

Figure 7:
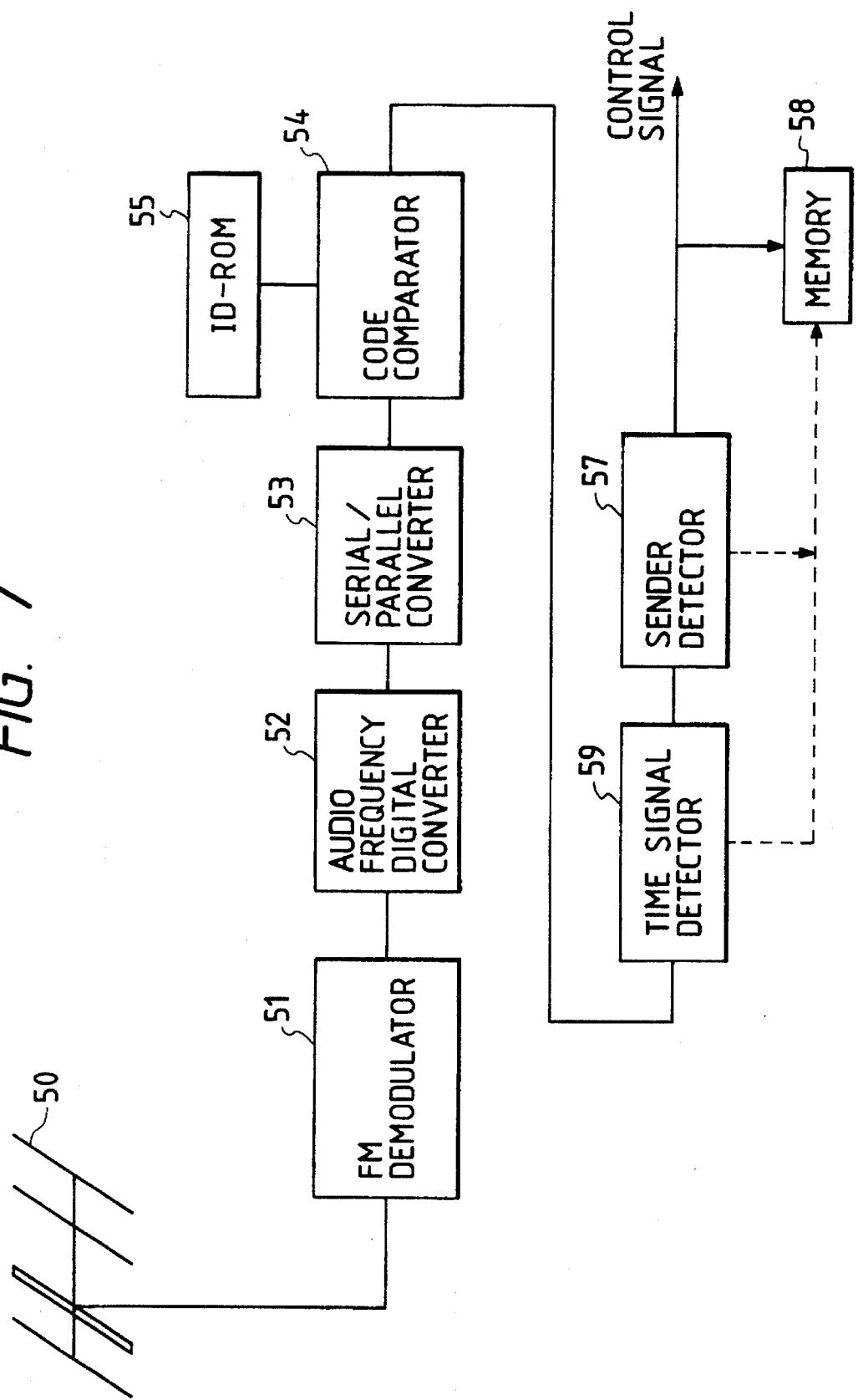
FIG. 7 shows a system for recording break operation by using time information and sender identification information, used in the battery power supply system of the present invention.

As shown in FIG. 7, by utilizing the sender identification information and the time information, the time of break and the person who broke can be recorded in a memory 58 by a time signal detector 59 and a sender detector 57. Accordingly, it is possible to determine whether a controller (electric power service company) who controls many regions has made the break because of the reverse charge or an operator has made the break for a work on site, and can grasp the risk condition of the reverse charge in the region.

However, if the amount of information is too much, it may cause the reduction of the transmission rate and the transmission reliability. Accordingly, the amount of information to be transmitted should be carefully determined. The wireless communication means need not have transmission means but the object of the present invention can be achieved only by the reception means.

EMBODIMENT 1

The solar cell array 1 comprises 20 amorphous silicon solar cell modules (rated voltage 12 volts, rated power 22 watts) to form 240 V–440 W solar cell array. The inverter 2 is a self-excited transistor inverter (rated output 50 W, 100 V). The break device 3 is a combination of a sequencer and a transducer which breaks the commercial power system when an AC excess current or excess voltage occurs, as shown in FIG. 1.

Figure 3:
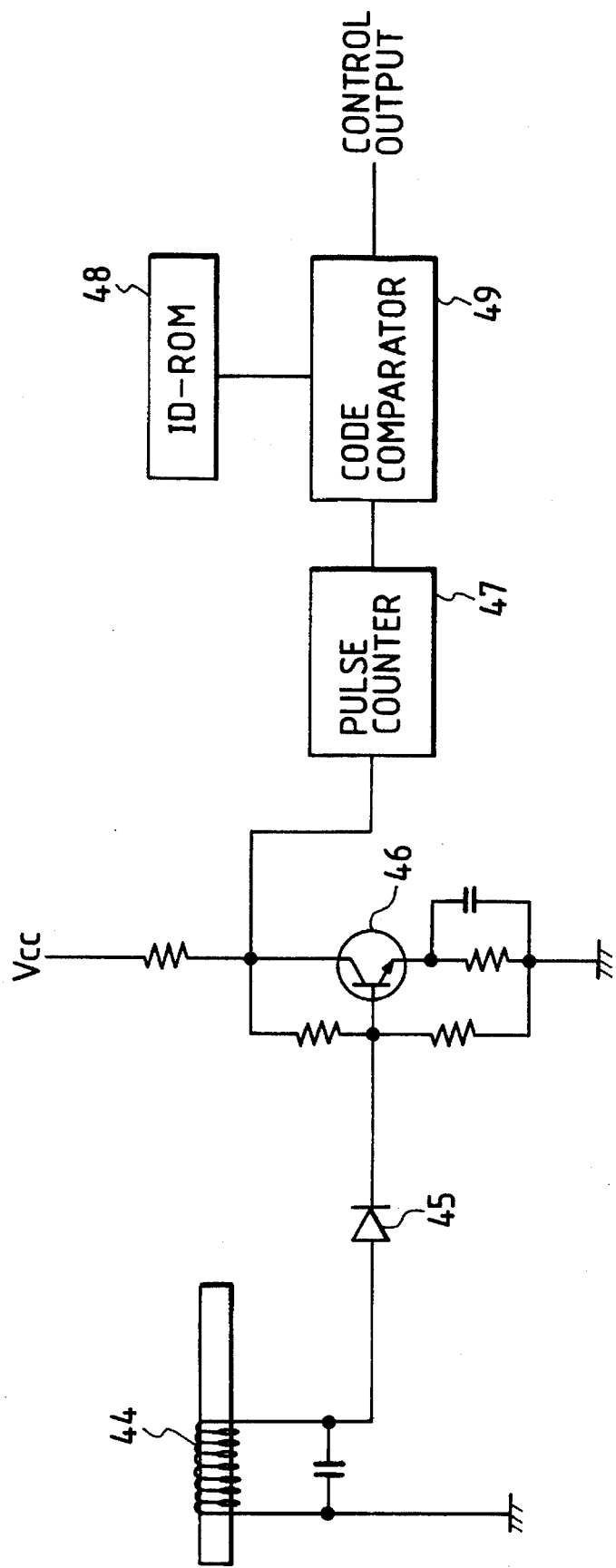
FIG. 3 shows an embodiment of the wireless communication means used in the battery power supply system of the present invention.
Figure 4:
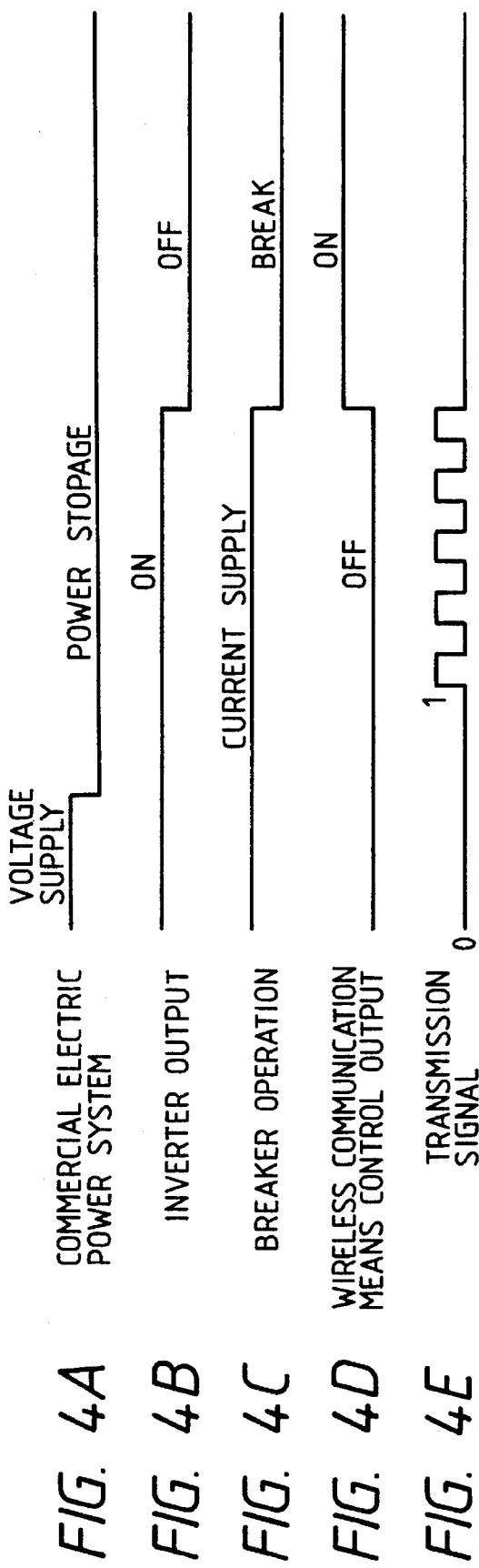
FIGS. 4A–4E show timing charts of operations of the embodiment.

The wireless communication means 4 is constructed as shown in FIG. 3. The antenna 44 is a middle wave broadcast bar antenna having a receiving frequency of 1630 KHz. The received signal is detected by a diode 45, converted to a pulse signal by a transistor 6, and it is supplied to a pulse counter 47. An output of the pulse counter 47 is compared with an ID number stored in an ID ROM 48 by a code comparator 49. When the output coincides with the ID number, the code comparator 49 produces a control output. The control output is supplied to the inverter 2 and the control unit in the break device 3. Since only the break operation is carried out in the present embodiment, the ID information and the operation command information are shared. The ID number is 5. Thus, when five pulses are inputted, the count "5" in the pulse counter 47 and the value from the ID ROM 48 (the ID number which is equal to 5) coincide so that the code comparator 49 produces the control output to break the power.

The load 5 comprises four 100 watts bulbs. The procedures of operation are shown below.

(1) First, the solar cell generation system is started while the commercial power system is in an ON state.

(2) Then, the commercial power system is turned OFF and the solar cell generation system is operated singly.

(3) A break pulse is generated by the transmitter to break the solar cell generation system.

Operation charts are shown in FIGS. 4A–4E. The control output is ON when five pulses have been applied and the inverter and the break device are actuated to stop the solar cell generation system.

EMBODIMENT 2

Figure 5:
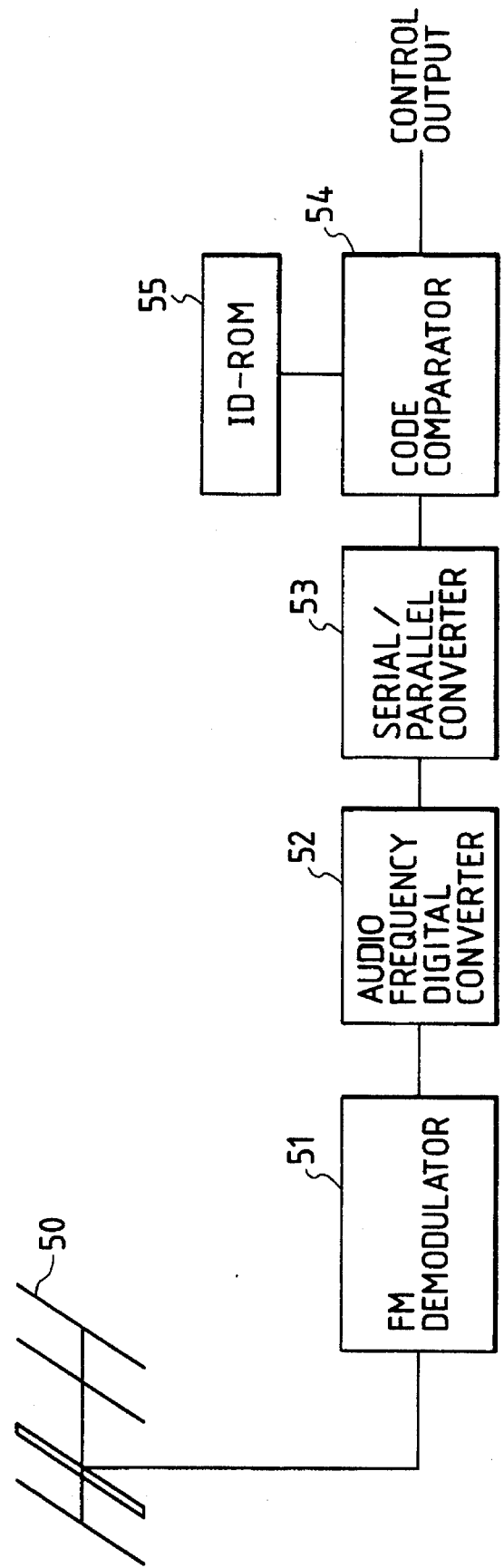
FIG. 5 shows another embodiment of the wireless communication means used in the battery power supply system of the present invention.

The solar cell array 1, the inverter 2 and the break device 3 are of the same configuration as those of FIG. 1, and the wireless communication means 4 is constructed as shown in FIG. 5. In the present embodiment, a code is transmitted in an audio frequency band by using a modem for a telephone line. The modulation of the electromagnetic wave is done by a frequency modulation at frequency of 140 MHz. In this frequency band, the antenna 50 may be an inexpensive TV broadcast Yagi antenna. The signal received by the antenna 50 is applied to an FM demodulator 51 which demodulates ID signal comprising a code of the audio frequency band. It is then converted to digital data by an audio frequency-digital converter 52, and to parallel data by a serial-parallel converter 53, and it is compared with ID information from the ID ROM 55 by a code comparator 54, which generates a control output when both are coincident. The ID signal is "TEST2" and the operation command signal is shared by the ID information. The operation was checked in the same procedures as those of the embodiment 1. The ID information "WRONG" was then sent in the same procedures but the system did not break and it operated as designed.

EMBODIMENT 3

Figure 8:
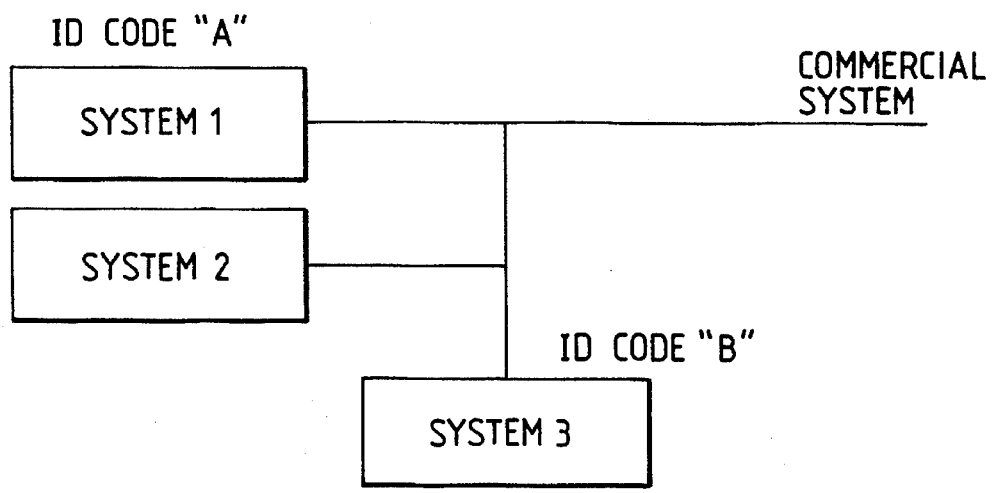
FIG. 8 shows a system combined with the system of the present invention.

The communication frequency is 420 MHz and three solar cell generation systems of the same configuration as that used in the embodiment 2 are parallelly connected to form a solar cell generation system shown in FIG. 8. The antenna is a UHF TV antenna. ID information "A" is assigned to two (solar cell generation systems 1 and 2) of the three solar cell generation systems and ID information "B" is assigned to the remaining one (solar cell generation system 3). The load is adjusted to singly operate the solar cell generation system, and the ID code "A" was transmitted. The two systems 1 and 2 having the coincident ID code stopped the operation, and immediately thereafter, the system 3 having the ID code "B" assigned thereto stopped the operation. This is because an excess voltage occurs in the last system 3 and the break operation is caused by the excess voltage. In this manner, when a portion of the system does not operate, it affects to all of the reverse charge system so that other solar cell generation systems are blocked. Thus, the system is highly safe.

In the above embodiments, the solar cell generation system comprises the solar cell array 1, the DC-AC inverter 2, the commercial power system break device 3 and the wireless communication means 3, and the break device 3 is controlled its conduction and break by the wireless communication means 4. It offers the following effects:

(1) Since all of the solar cell generation systems in the specified region can be simultaneously broken by one transmission of the break signal, the reverse charge phenomenon occurred over a wide region can be quickly released.

(2) Since the transfer break system is used, the solar cell generation system can be broken without failure.

(3) Where complex operation command information such as that including time information and sender identification information is used, fine control may be made to the solar cell generation system.

(4) Since the power supply service company can centrally control the solar cell generation systems, the solar cell generation systems can be safely installed in the operation sequence of the automatic reclosure.

(5) Even if a system which is not sensitive to the break signal is included, it is eventually broken when most systems are broken. Accordingly, the system is safe.

(6) Where the frequency of the wireless communication is set to the frequency band of the TV broadcast, there is no need to separately install an antenna and the present solar cell generation system can be easily and inexpensively installed.

The value of industrial utilization of the present invention having such excellent effects is very high.

EMBODIMENT 4

Figure 9:
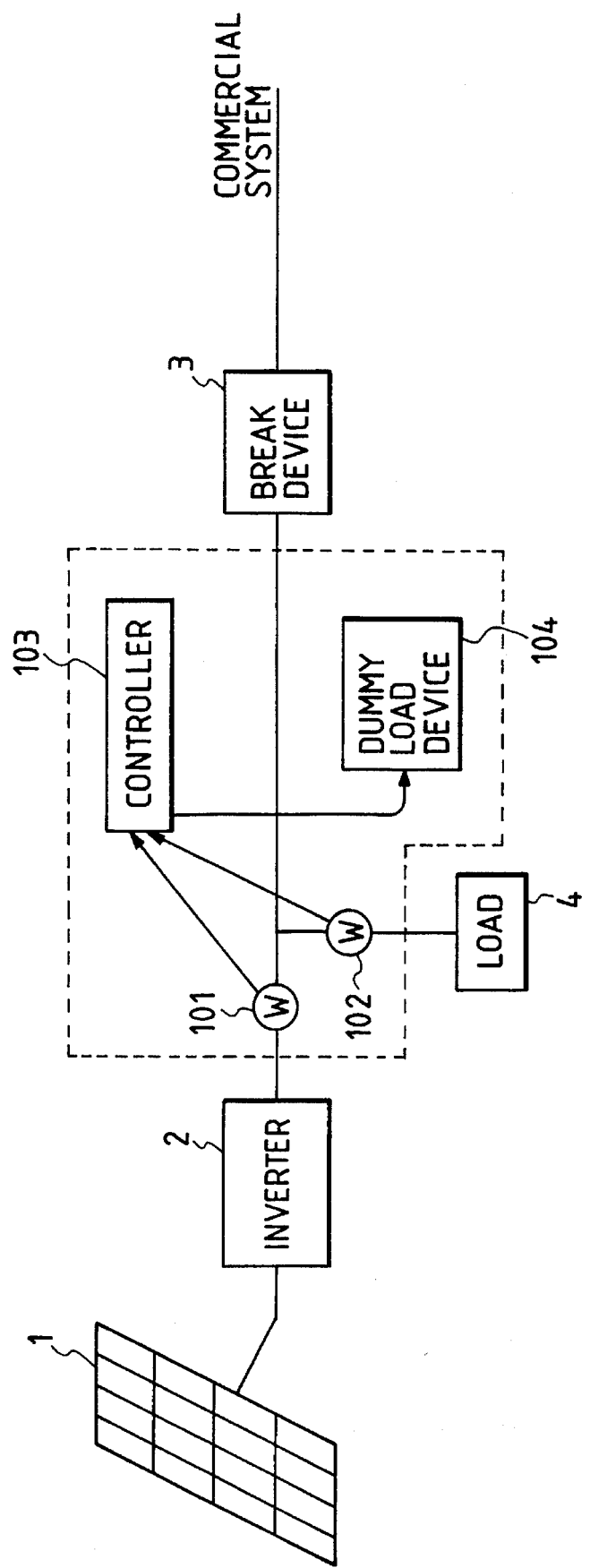
FIG. 9 shows a battery power supply system having a reverse current and reverse charge prevention device of the present invention.

An embodiment of the solar cell generation system which uses the reverse current and reverse charge prevention device of the present invention is shown in FIG. 9.

In FIG. 9, a portion enclosed by broken lines is the reverse current and reverse charge prevention device of the present invention.

A solar cell array 1 comprising a plurality of solar cell modules converts sun shine to a DC power. A DC-AC inverter 2 converts the DC power from the solar cell array to an AC power. The inverter 2 may be self-excited type or separately excited type, and a PWM self-excited inverter which uses IGBT, power MOSFET and power transistor as switching devices is preferable. The inverter includes gate control means for the switching devices to start and stop the inverter. A maximum power tracking function for the solar cell is also provided so that a maximum available power can always be taken out of the solar cell array. A break device 3 mechanically separates the commercial power system from the solar cell system. Numeral 4 denote a load such as a user, and specifically it is a home electric equipment.

Numeral 101 denotes power measurement means for measuring the output of the inverter 2. It may be a power meter or a combination of an ammeter and a volt meter. In the latter case, the measurements are multiplied by each other to calculate an integration in a period of the commercial power system frequency to determine the power. The measurement means may be a current transformer, a voltage transformer or a digital power meter. Numeral 102 denotes power measurement means for measuring an input power from the commercial power system. It may be a power meter or a combination of an ammeter and a volt meter, as the above power measurement means is. Numeral 103 denote a control unit (controller) which receives the measurement outputs from the power measurement means 101 and 102 and processes them to produce a control output. The control means may be a programmable controller. Numeral 104 denotes a dummy load for controlling the amount of load. It may be an electronic load device, a combination of a resistive load and a slidac transformer, a combination of a resistive load and a triac device, a plurality of resistors selectable by relays or a secondary battery.

The control unit 103 continuously monitors the output of the inverter 2 and the power consumption of the load 4 by the two power meters 101 and 102 and controls the dummy load 104 such that the dummy load 104 consumes the output of the inverter 2 to maintain the minimum receiving power when a difference between the power consumption of the load 4 and the output of the inverter 2 becomes smaller than the minimum receiving power.

In the reverse current and reverse charge prevention device of the present invention, the inverter output and the power consumption of the load are continuously monitored, and when the difference between the power consumption of the load and the inverter output is larger than the minimum receiving power, the control command is issued to the load to consume more power than the minimum receiving power. As a result, the output from the inverter is totally consumed in the premises of the user and the reverse current and reverse charge to the system is prevented.

EMBODIMENT 5

A solar cell generation system which uses the device of the present invention is constructed as shown in FIG. 9.

The solar cell array 1 comprises 20 amorphous silicon solar cell modules (rated voltage 12 V, rated power 22 W) to form an array of 240 V, 440 W. The inverter 2 is a self-excited transistor inverter (rated output 500 W, 100 V, operable in a reverse correct mode). The break device 3 is a combination of a sequencer and a transducer which breaks the commercial system when an excess current or excess voltage occurs. The load 4 comprises three 100 W bulbs.

A minimum receiving power is 10 W.

The power measurement means 101 is a power meter which measures the output power of the inverter and produces a digital output, and the power measurement means 102 is a power meter which measures the power consumption of the load and produces a digital output. The measurement outputs are supplied to a measurement control computer which serves as the control unit 103, through a GPIB interface. The control output of the control unit 103 is supplied to an electronic load device which serves as the dummy load 104, through the GPIB interface.

Figure 10:
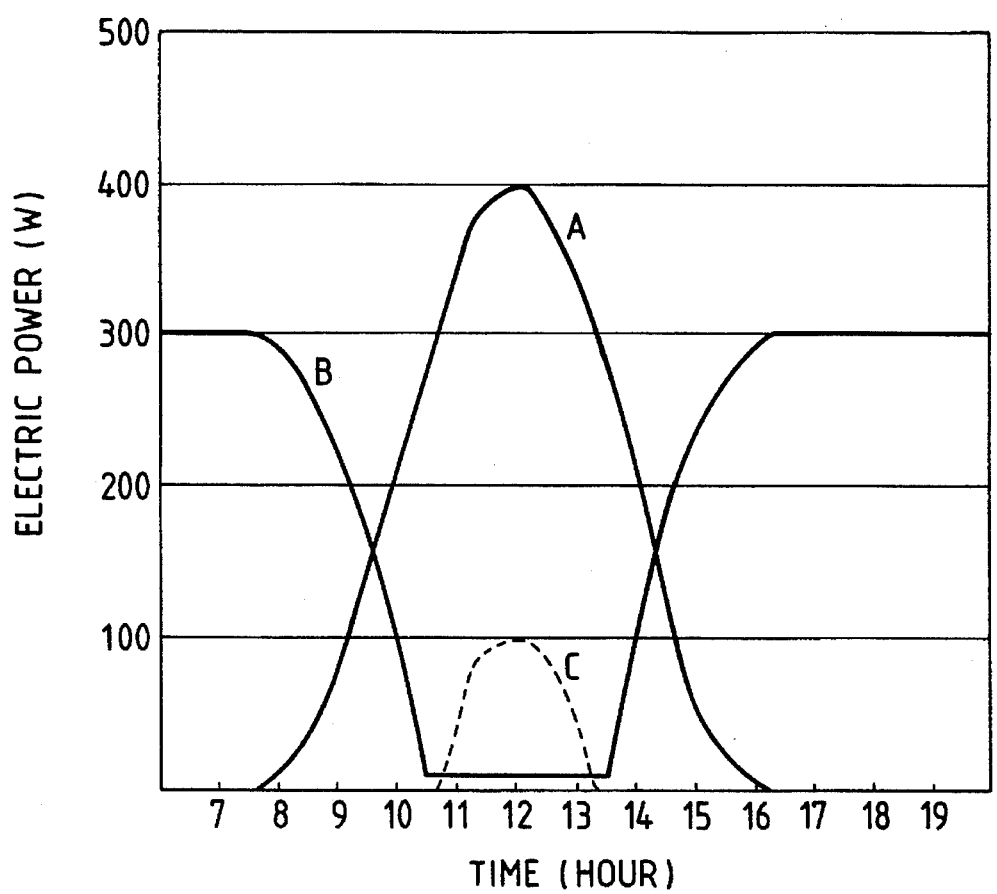
FIG. 10 shows an operation chart of the reverse current and reverse charge prevention device used in the battery power supply system of the present invention.

An operation chart of the reverse current and reverse charge prevention device in the solar cell generation system of the present invention on a fine weather day is shown in FIG. 10. An abscissa represents a time and an ordinate represents a power.

From around 8:00 a.m. when the sun has risen and the sun shine becomes strong, the inverter output starts to increase as shown by a solid line A.

Around 10:33 a.m., the inverter output exceeds 290 W and the electronic load device starts to operate. Until 13:30 thereafter, the receiving power is kept at a minimum receiving power 10 W as shown by a solid line B so that the reverse current and the reverse charge are prevented.

The power shown by a broken line C in FIG. 10 shows the reverse current power created when the present device is not used.

EMBODIMENT 6

The solar cell array 1, the inverter 2, the break device 3 and the load 4 are of the same construction as those of the embodiment 5 and the reverse current and reverse charge prevention device is constructed as shown in FIG. 11.

Current transformers (CT) 201 and 202 and potentio-transformers (PT) 203 and 204 are connected to power transducers 205 and 206 to form two sets of power meters. They are arranged to measure the inverter output and the input power from the commercial power system. Those outputs are produced as 8-bit digital signals, which are supplied to general purpose parallel port of the control unit 103. In the present embodiment, the dummy load 104 comprises eight 30 W bulbs and eight relays serially connected thereto. Drive inputs of the relays are connected to other general purpose parallel port of the control unit 103. As a result, the dummy load 104 has a power consumption which is an integer multiple of 30 W.

In the present embodiment, since the dummy load 104 assumes only the integer multiple of 30 W, the receiving power is little bit larger than that of the embodiment 5. However, an expensive electronic load device is not required and the control unit is compact.

EMBODIMENT 7

Figure 12:
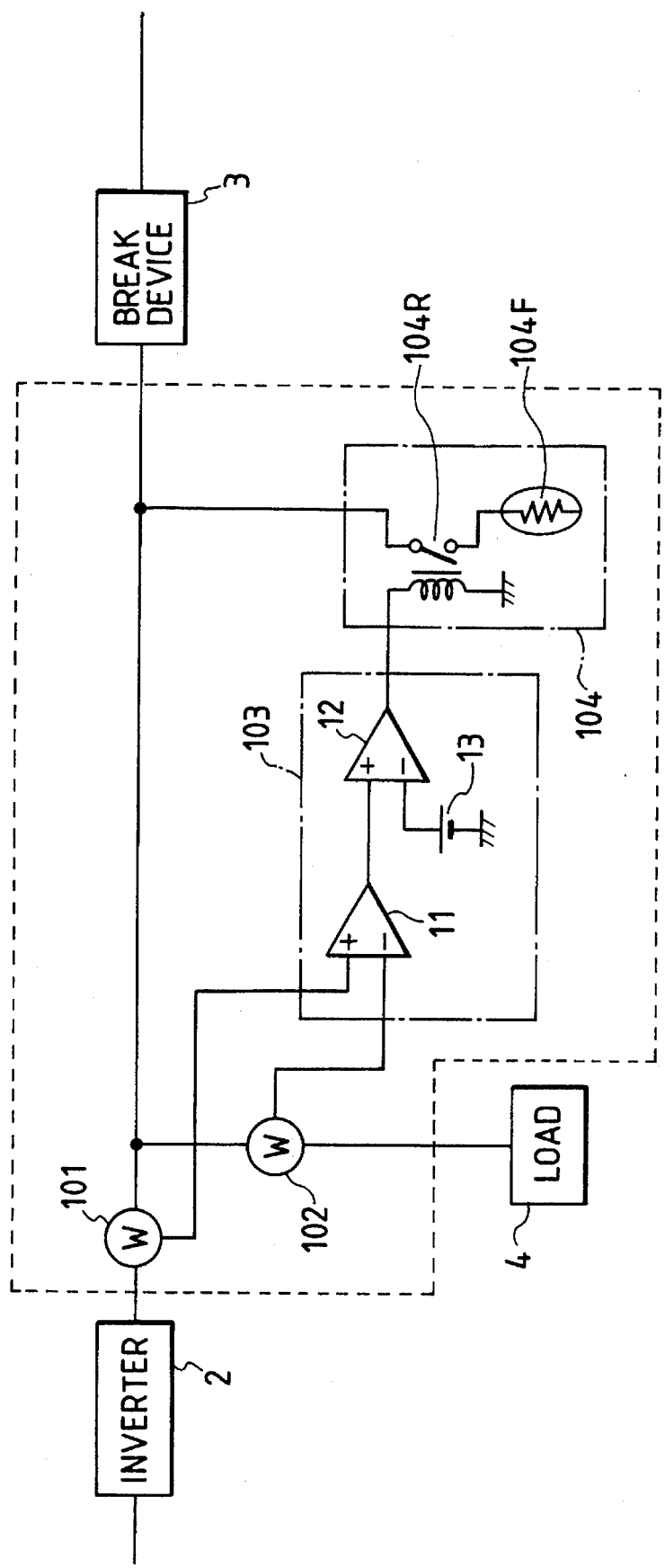
FIG. 12 shows a further embodiment of the battery power supply system having the reverse current and reverse charge prevention device of the present invention.
Figure 13:
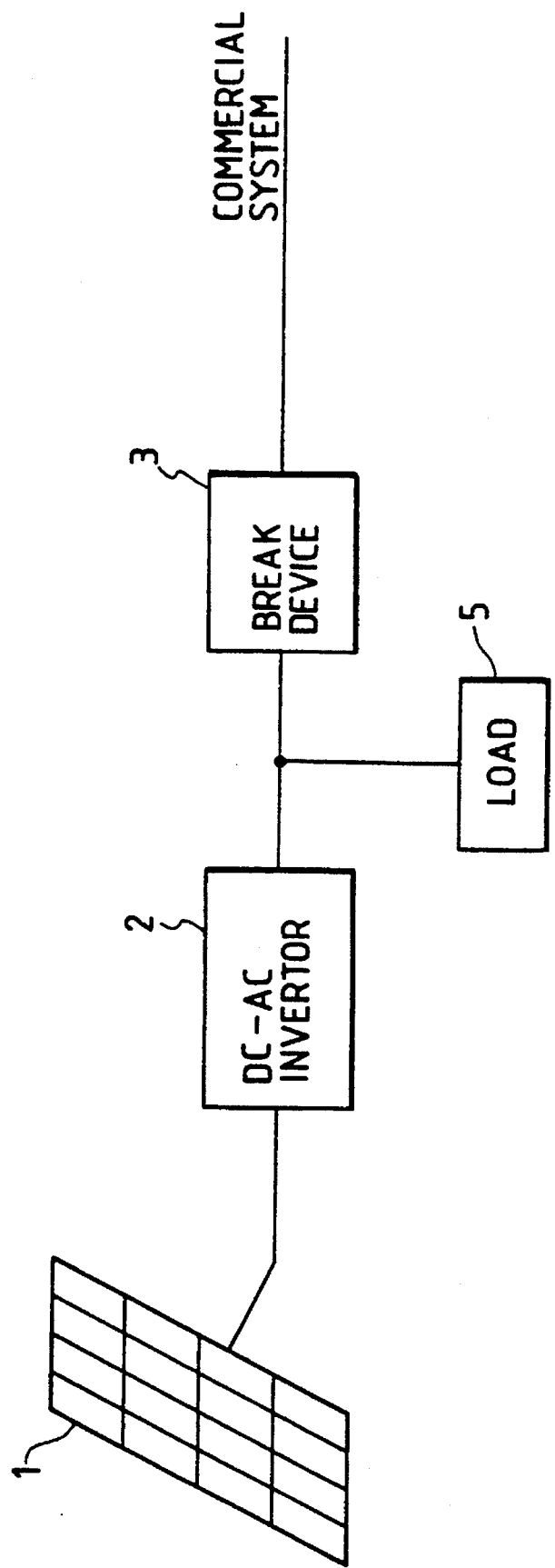
FIG. 13 shows a configuration of a prior art battery power supply system.

The solar cell array, the inverter, the break device and the load are of the same construction as those of the embodiment 5 and the reverse current and reverse charge prevention device is constructed as shown in FIG. 12.

The power measurement means 101 and 102 are power meters which produce analog measurement outputs and they are arranged to measure the inverter output and the input power from the commercial power system, respectively.

Those outputs are supplied to the control unit 103 which comprises an operational amplifier. The operational amplifier 11 is an adder which calculates a difference between the output of the inverter 2 and the power consumption of the load 4 based on the measurements of the power meters 101 and 102. The output of the operational amplifier 11 is supplied to a comparator 12 which compares it with a voltage 13 corresponding to the minimum receiving power, and produces an output when the difference between the power consumption of the load 4 and the output of the inverter 2 is smaller than the minimum receiving power. The output of the control unit 103 is either digital value "1" or "0", which drives a relay 104R in the dummy load device 104. A 400 W heater is connected to the relay 104R as a load.

In the present embodiment, the receiving power is larger than that of the embodiment 6 but the configuration of the present embodiment is very simple.

As described above, the embodiments 5–7 relate to the reverse current and reverse charge prevention device to be added to the solar cell generation system comprising the solar cell array, the DC-AC inverter which may operate in the reverse current mode, and the load. It comprises the power measurement means for measuring the output of the inverter, the power measurement means for measuring the input power from the commercial system or the power consumption of the load, the dummy load device capable of controlling the amount of load, and the control means for supplying the load control signal to the dummy load device in accordance with the measurements by the power measurement means. The solar cell generation system free from the reverse current and the reverse charge can be constructed by merely adding the present device as the reverse current and reverse charge prevention device, without modifying the inverter.

In accordance with the present invention, the reverse charge is quickly released and the reverse current is prevented.

What is claimed is:

1. A power supply system comprising:

a first power supply connected in a system line;

a DC-AC inverter for converting a DC output of said first power supply to an AC output so as to supply the converted AC output to a load;

a second power supply for supplying an AC power to the load connected in the system line; and a break device for electrically disconnecting the first power supply from the system line in response to information derived from a wireless communication means.

2. A power supply system according to claim 1, wherein the frequency of said wireless communication means is around a middle wave broadcast band.

3. A power supply system according to claim 1, wherein the frequency of said wireless communication means is around a TV broadcast band.

4. A power supply system according to claim 1, wherein said information comprises time information.

5. A power supply system according to claim 1, wherein said information comprises identification information.

6. A power supply system according to claim 1, wherein the first power supply comprises solar cell battery power supplying means.

7. A power supply system according to claim 1, further comprising means for turning off said DC-AC inverter.

8. A method of breaking power from a battery power supply, comprising the steps of:

electrically connecting a first power supply, a DC-AC inverter for converting a DC output of the first power supply to an AC output so as to supply the converted AC output to a load and a second power supply for supplying an AC power to the load in a common system line; and electrically disconnecting said first power supply from the system line in response to information derived from a wireless communication.

9. A method according to claim 8, wherein said battery power supply is a solar cell battery power supply.

10. A method according to claim 8, wherein a frequency of the wireless communication is set around the middle wave broadcast band.

11. A method according to claim 8, wherein a frequency of the wireless communication is set around the TV broadcast band.

12. A method according to claim 8 wherein the wireless communication comprises time information.

13. A method according to claim 8, wherein the wireless communication comprises identification information.

* * * * *

UNITED STATES PATENT AND TRADEMARK OFFICE
CERTIFICATE OF CORRECTION

PATENT NO. : 5,592,074
DATED : January 7, 1997
INVENTOR(S) : Nobuyoshi TAKEHARA

It is certified that error appears in the above-indentified patent and that said Letters Patent is hereby corrected as shown below:

ON THE COVER PAGE:

Under References Cited, FOREIGN PATENT DOCUMENTS,

Item [56], "04153713  5/1992    Japan
        05091671  4/1993    Japan" should read --4-153713  5/1992    Japan
          5-91671   4/1993    Japan--.

COLUMN 1

Line 32, "sum shine," should read --sunshine,--.

COLUMN 5

Line 21, "a" should be deleted.

COLUMN 6

Line 10, "failure" should read --failure.--

COLUMN 8

Line 25, "sun shine" should read --sunshine--;

Line 36, "denote" should read --denotes--;

Line 49, "denote" should read --denotes--.

UNITED STATES PATENT AND TRADEMARK OFFICE
CERTIFICATE OF CORRECTION

PATENT NO. : 5,592,074
DATED : January 7, 1997
INVENTOR(S) : Nobuyoshi TAKEHARA

It is certified that error appears in the above-indentified patent and that said Letters Patent is hereby corrected as shown below:

COLUMN 9

Line 40, "sun" (2nd occ.) should read --sun--.

COLUMN 10

Line 2, "other" should read --another--.

COLUMN 12

Line 17, "claim 8" should read --claim 8,--.

Signed and Sealed this

Fifteenth Day of July, 1997

Attest:

BRUCE LEHMAN

Attesting Officer

Commissioner of Patents and Trademarks